United States Patent [19]

Hayner et al.

[11] Patent Number: 5,961,709
[45] Date of Patent: Oct. 5, 1999

[54] ENVIRONMENTALLY IMPROVED ASPHALT COMPOSITIONS AND THEIR PREPARATION

[75] Inventors: Roger E. Hayner, Russell; Patricia K. Doolin, Ashland, both of Ky.; James F. Hoffman, Huntington, W. Va.; Robert H. Wombles, Gibsonia, Pa.

[73] Assignee: Marathon Ashland Petroleum LLC

[21] Appl. No.: 09/025,873

[22] Filed: Feb. 19, 1998

Related U.S. Application Data

[63] Continuation-in-part of application No. 08/697,385, Aug. 23, 1996.

[51] Int. Cl.$^6$ .................................................. C09D 195/00
[52] U.S. Cl. ........................... 106/280; 106/279; 524/62; 524/71
[58] Field of Search .................... 106/280, 279; 524/62, 71

[56] References Cited

U.S. PATENT DOCUMENTS

| | | | |
|---|---|---|---|
| 3,607,334 | 9/1971 | Fauber | 106/279 |
| 3,655,563 | 4/1972 | Fauber et al. | 106/272 |
| 3,663,281 | 5/1972 | Fauber | 106/279 |
| 3,920,467 | 11/1975 | Stewart et al. | 106/273 |
| 4,499,187 | 2/1985 | Blackburn et al. | 435/34 |
| 5,308,470 | 5/1994 | Blackburn et al. | 208/14 |
| 5,601,697 | 2/1997 | Miller et al. | 208/945 |

FOREIGN PATENT DOCUMENTS

| | | | |
|---|---|---|---|
| 60292771 | 7/1987 | Japan | C08L 95/00 |

OTHER PUBLICATIONS

CA 127:152008, Feng et al., "Development and application of paving asphalt . . . ",Oct. 1996.

*Primary Examiner*—David Brunsman
*Attorney, Agent, or Firm*—Laurence P. Hobbes; Richard D. Stone

[57] ABSTRACT

An environmentally improved asphalt paving composition which contains a solvent-precipitated asphaltene, such as solvent deasphalting bottoms, and a viscosity reducing amount of paraffinic fluxing component, e.g., 325 Neutral Oil.

20 Claims, No Drawings

ENVIRONMENTALLY IMPROVED ASPHALT COMPOSITIONS AND THEIR PREPARATION

RELATED APPLICATIONS

This case is a continuation in part of U.S. patent application Ser. No. 08/697,385 (Docket 6505AUS), filed Aug. 23, 1996, the contents of which are incorporated herein by reference.

BACKGROUND OF THE INVENTION

I. Field of the Invention

The invention relates to improved asphalt compositions containing i) a solvent precipitated asphaltene component, e.g., solvent-deasphalted bottoms and ii) a viscosity reducing amount of paraffinic fluxing component added to improve rheological properties. The invention further relates to such improved asphalt compositions useful in a variety of applications, particularly paving asphalts where the reduced smoking characteristics of the compositions during paving are especially beneficial.

II. Description of the Prior Art

Solvent deasphalting (extraction of asphalts from heavy petroleum stocks) is a well-known petroleum process and is described in U.S. Pat. No. 3,951,781 to Owen (Mobil); U.S. Pat. No. 3,968,023 to Yan (Mobil); U.S. Pat. No. 3,972,807 to Uitti (UOP); U.S. Pat. No. 3,975,396 to Bushnell (Exxon); U.S. Pat. No. 3,981,797 to Kellar (UOP); U.S. Pat. No. 3,998,726 to Bunas (UOP); U.S. Pat. No. 4,017,383 to Beavon (Ralph M. Parsons); U.S. Pat. No. 4,054,512 to Dugan (Exxon); U.S. Pat. No. 4,101,415 to Crowley (Phillips); U.S. Pat. No. 4,125,458 to Bushnell (Exxon); and numerous others. Specific proprietary processes include the SOLVAHL solvent deasphalting process licensed by Institute Francais de Petrole, and the low-energy deasphalting process licensed by Foster Wheeler, U.S.A. Deasphalting processes also include the supercritical fluid technology licensed by Kerr-McGee Corporation.

U.S. Pat. No. 5,601,697 to Miller et al. teaches SDA-produced asphalts (containing solvent deasphalting bottoms) made by blending SDA bottoms with aromatic extract. Preferably the extract is produced from an extraction process such as that employed in lubricating oil production. The blending process produces asphalts of superior characteristics, e.g., PG64–22, which can meet the new Strategic Highway Research Program (SHRP) specifications for dynamic sheer, creep stiffness, and direct tension (tensile strength). As the new SHRP asphalt specifications impact the marketplace, particularly aided by the recent increases in federal funds for highway construction and repair, these new asphalt products will be particularly advantageous.

U.S. Pat. No. 3,607,334 to Fauber discloses an asphaltic composition used as felt saturants or roofing materials comprising a major amount of asphalt and a minor amount of a second pass foots oil derived from heavy lube distillate.

U.S. Pat. No. 3,920,467 to Stewart, et al. discloses an asphalt composition of enhanced durability. The composition comprises solvent deasphalting (SDA) bottoms unmodified or modified, e.g., by treatment with phenyl isocyanate. A minor amount of paraffinic foots oil (34 wt. %) is subsequently added to the unmodified or modified SDA bottoms in order to adjust the penentration of the samples.

U.S. Pat. No. 3,663,281 to Fauber, discloses asphaltic compositions suited for use in paper laminates which are prepared by airblowing a blend of a major amount of asphalt and a minor amount of foots oil derived from slack wax from a medium lubricating oil distillate.

U.S. Pat. No. 4,499,187 to Blackburn, et al., discloses a method for evaluating carcinogenic activity of hydrocarbons by biological assay. Low carcinogenic activity for solvent refined/dewaxed residual oil and solvent refined/hydrotreated heavy paraffinic distillate is shown in Table II. The reference neither discloses nor suggests the incorporation of such materials in asphalt paving compositions.

U.S. Pat. No. 5,308,470 to Blackburn, et al., discloses asphalt compositions comprising asphalt blending stocks prepared by the distillation of deasphalted oils, or bright stock extracts (aromatic extracts) into specific IBP and 5% Overhead Boiling ranges to limit their mutagenicity indices. The reference does not suggest the addition of paraffinics to reduce mutagenicity of asphalt compositions.

Parent U.S patent application Ser. No. 08/697,385, filed Aug. 23, 1996 (docket number 6505AUS), discloses asphalt compositions containing a solvent refined paraffinic neutral mineral lubricating oil and an optional polymer additive.

III. Problems Presented by Prior Art

Solvent precipitated asphaltenes such as solvent deasphalter (SDA) bottoms are relatively inexpensive sources of asphalt as compared to atmospheric bottoms or vacuum bottoms. However, SDA bottoms alone, as originally constituted, fail to meet product specifications as paving grade asphalts owing, in large part, to shortcormings in durability and elasticity. The asphalt compositions containing SDA bottoms may be incapable of meeting requirements for resistance to low temperature thermal cracking in certain climatic areas or condition. Modification to meet low temperature requirements can be made by adding aromatic oils such as lube plant extracts as fluxing components in order to improve viscosity. In addition, polymeric additives can be added to maintain or increase high temperature rutting resistance. However, the presence of aromatics tends to solvate polymeric additives and thus increases the amount of polymeric additives required to obtain the required high temperature rutting resistance. Consequently, the price advantage of SDA asphalts over neat material can be severely reduced or eliminated for the production of specialty asphalt grades.

Another problem resulting from the addition of aromatics is that at higher temperatures encountered during hot mixing of aggregate and road construction, volatilization and smoking of the asphalt paving composition can occur. Smoking is particularly problematic when asphalt paving compositions contain high levels of an aromatic component, e.g., lube plant extract added as a fluxing component. Such extracts may contain carcinogenic complex polynuclear hydrocarbons such as derivatives of 1,2-benzanthracene, e.g., 5,10-dimethyl-1,2-benzanthracene, 1,2,5,6-dibenzanthracene, methylcholanthrene, and 3,4-benzopyrene. Because asphalt compositions containing aromatics are subject to generating vapors and smoke under road surfacing conditions, they meet with reduced commercial acceptability by the paving industry who are concerned with exposure of roadway construction personnel and the public to aromatic vapors and smoke, given the known carcinogenity of certain aromatic materials.

Accordingly, it would be useful to provide a paving asphalt composition containing solvent precipitated asphaltenes which meets low temperature thermal cracking requirements and which produces less vapor and smoke than asphalt compositions which contain aromatic fluxing components. It would be further advantageous to provide a paving asphalt composition which contains solvent precipitated asphaltenes and a fluxing component present in amounts sufficient to meet low temperature thermal cracking requirements, without limiting the effectiveness of polymeric components added to enhance high temperature properties such as rutting resistance.

SUMMARY OF THE INVENTION

I. GENERAL STATEMENT OF THE INVENTION

Accordingly, the present invention broadly relates to an environmentally improved asphalt paving composition which contains a solvent-precipitated asphaltene and a viscosity reducing amount of paraffinic fluxing component.

In one aspect, the present invention relates to an environmentally improved asphalt paving composition which comprises 1 to 90 wt. %, preferably 1.5 to 20 wt. %, of asphalt component containing, as a proportion of said asphalt component, at least 0.5 wt. %, preferably at least 1.0 wt. % solvent precipitated asphaltenes; 0.1 to 50 wt. %, preferably 0.5 to 10 wt. % of a paraffinic fluxing component; and 0 to 15 wt. %, preferably 0 to 10 wt. % aromatics having a 5% distillation boiling point of less than 510° C. (950° F.).

The present invention further relates to an asphalt paving composition which comprises 1.0 to 90 wt. %, preferably 1.5 to 20 wt. % of asphalt component containing, as a proportion of said asphalt component, at least 0.5 wt. %, preferably 1.0 to 75 wt. %, e.g., 30 to 50 wt. %, solvent precipitated asphaltenes; 0.1 to 50 wt. %, preferably 0.5 to 10 wt. % of a paraffinic fluxing component; 0 to 15 wt. %, preferably 0 to 10 wt. % aromatics having a 5% distillation boiling point of less than 510° C. (950° F.); and 0 to 12 wt. %, preferably 1 to 8 wt. %, e.g., 1 to 5 wt. %, of a polymer additive.

In another aspect, the asphalt paving composition of the present invention contains an asphalt component which comprises an unoxidized blend of solvent precipitated asphaltenes and paraffinic fluxing component.

The present invention also provides pavement compositions containing aggregate and 1 to 10 wt. %, preferably 2 to 7 wt. % of the above asphalt components.

In another aspect, the present invention relates to a method for preparing an environmentally improved asphalt composition containing a solvent-precipitated asphaltene component by adding a viscosity reducing amount of paraffinic fluxing component, i.e., an amount which reduces viscosity (as measured by ASTM D2170 and ASTM D2171 of the resulting asphalt composition as compared to an asphalt composition to which no fluxing component is added. The method also can improve low temperature properties of the resulting asphalt composition.

In a preferred embodiment, the asphalt component containing solvent-precipitated asphaltenes is a mixture containing 0.5 to 95 wt. %, preferably 5 to 90 wt. %, more preferably 10 to 80 wt. %, SDA bottoms, e.g., those obtained from solvent extraction of vacuum bottoms, said SDA bottoms having Ring and Ball Softening Points ranging from 40° to 120° C., and boiling points greater than 510° C. (950° F.), preferably greater than 540° C. (1000° F.).

In another embodiment, 0.5 to 90 wt. %, preferably 10 to 75 wt. %, of vacuum tower bottoms from vacuum distillation, e.g., AC5, may be added to the asphalt component as well.

ASPHALT COMPONENTS

Suitable asphalt components include a variety of organic materials, solid or semi-solid at room temperature, which gradually liquid when heated, and in which the predominate constituents are naturally occurring bitumens, e.g., Trinidad Lake, or residues conmonly obtained in petroleum, synthetic petroleum, or shale oil refining, or from coal tar or the like. For example, vacuum tower bottoms produced during the refining of conventional or synthetic petroleum oils are a common residue material useful as asphalt composition. In the present invention, the asphalt component comprises solvent precipitated asphaltenes as a necessary element, e.g., solvent deasphalting bottoms.

SOLVENT-PRECIPITATED ASPHALTENES

Solvent precipitated asphaltenes include the products of solvent deasphalting, i.e., solvent deasphalted bottoms. Solvent deasphalting bottoms are obtained from suitable feeds such as vacuum tower bottoms, reduced crude (atmospheric); topped crude, and preferably hydrocarbons comprising an initial boiling point of about 450° C. (850° F.) or above. Preferably the solvent deasphalting bottoms are obtained from vacuum tower bottoms, preferably boiling above 538° C. (1000° F.). Solvent deasphalting can be carried out at temperatures of 93–148° C. (200–300° F.). After solvent deasphalting, the resulting SDA bottoms have a boiling point above 510° C. (950° F.), preferably above 540° C. (1000° F.), and a penetration of 0 to 70 dmm @ 25° C. (77° F.), preferably 0 to 50 dmm @ 25° C. (77° F.). Pumpable blends of SDA bottoms containing 5 to 15 wt. %, preferably about 10 wt. % aromatic extract are particularly useful in the present invention.

PARAFFINIC FLUXING COMPONENTS

Suitable paraffinic fluxing components are added to improve the flow properties of the asphalt composition and can improve the penetration for a desired softening point. The paraffinic fluxing components were not expected to blend well with the solvent precipitated asphaltene-containing asphalt component. However, it has been found that the paraffinic fluxing components can be blended with the asphalt component to provide a surprisingly homogeneous composition which can meet Superpave performance graded specifications with improved low temperature properties as described in "Superpave Performance Graded Asphalt Binder Specification and Testing," Asphalt Institute Superpave Series No. 1 (SP-1) (1997). Such fluxing components can include paraffinic materials such as gas oils (which can contain both isoparaffins and monoaromatics). Gas oils include neutral oils, including hydrocracked or isodewaxed neutral oils. Suitable paraffinic fluxing components include paraffinic oils having at least 50 wt. % paraffins content (isoparaffins and normal paraffins) such as foots oil (which is highly paraffinic and obtained from deoiling slack wax), as well as slack wax itself. Poly (alphaolefins) (PAOs) are also suited for use as fluxing components.

Foots Oil The foots oil suited to use in the present invention can be a by-product in the production of paraffin wax and can be the first foots oil fraction obtained from slack wax derived from a medium lubricating oil distilled from a mineral oil. The foots oil can be prepared by feeding a waxy petroleum crude oil to a crude still and taking off various cuts including a cut called medium lube distillate which is the preferred source of the foots oil used in this invention and which boils primarily in the range of 700 to 1000° F., preferably 800 to 900° F., and has an API specific gravity of 26, e.g., 25.5 to 26.5. This medium lube distillate may advantageously be further refined to improve color stability by solvent extraction using, e.g., phenol or furfural to remove aromatic type compounds. The lube distillate or the raffinate from solvent extraction is further refined by dewaxing, often at relatively low temperatures of, for example, −10° F., using various solvents or mixtures of solvents such as methyl ethyl ketone, benzene, acetone, and toluene to produce, after removal of the solvent, what is called a base lube oil stock and a slack wax. The slack wax is further refined to produce a deoiled slack wax and a foots oil, for instance, by further solvent extraction, using the same solvents but at higher temperatures, e.g., about 45° F., as in the dewaxing step above or by sweating.

The foots oil employed in the present invention can be relatively low in aromatic compounds and is composed principally of n-paraffins, isoparaffins and monocyclic naphthenes. More specifically, the composition of the foots oil used can be about 40–50 wt. % n-paraffins, 5–15 wt. % iso-paraffins, 35–45 wt. % monocyclic naphthenes and 1–5 wt. % aromatics.

ASPHALT CEMENT

The asphalt composition of the present invention may optionally include an asphalt cement component of reduced viscosity relative to the SDA bottoms component. Such asphalt cement component can have a viscosity of 100 to 5000 poises at 60° C. (140° F.), preferably 250 to 4000 poises, e.g., 500 poises for AC5 asphalt cement. The asphalt cement component is added in amounts sufficient to provide the resulting asphalt composition with the desired viscosity for the intended application, e.g., 2000 poises at 60° C. (140° F.) for paving applications. For Performance Graded Applications, the asphalt compositions will have a G*/sin delta value in excess of 1.0 kPa at temperatures ranging from 46 to 82° C., preferably 52 to 76° C. Generally, the asphalt compositions of the present invention may contain from 0 to 95 wt. %, preferably from 0 to 80 wt. %, e.g., 40 to 60 wt. %, of such asphalt cement component. The asphalt cement component of reduced viscosity can be obtained from any suitable source, e.g., atmospheric distillation bottoms.

POLYMER ADDITIVES

Particularly useful is the addition of SB (styrene butadiene) diblock copolymers or SBS (styrene butadiene styrene) triblock copolymers to the blended asphalt products of the present invention which contain SDA bottoms. While the invention is not to be limited to any theory, these copolymers form elastomeric matrices within the solvent deasphalted blends of the invention, and the aromatic oils in the asphalt blends help to solubilize the copolymers into the asphalt, providing substantially improved stability. Suitable polymers include styrene-butadiene, and others such as those taught in U.S. Pat. No. 4,554,313 to Hagenbach (assigned Elf); U.S. Pat. No. 4,242,246 to Maldonado (Elf); U.S. Pat. No. 4,162,999 to Bohemen (British Petroleum); U.S. Pat. No. 5,120,777 to Chaverot (Elf); U.S. Pat. No. 4,567,222 to Hagenbach (Elf); U.S. Pat. No. 5,118,733 to Gelles (Shell); U.S. Pat. No. 5,039,342 to Jelling (National Patent Development); U.S. Pat. No. 5,023,282 to Neubert (GenCorp); U.S. Pat. No. 3,238,173 to Bailey (Shell); U.S. Pat. No. 4,585,816 to Vitkuske (Dow Chemical) (diene/vinyl aromatic block copolymers, e.g. methylstyrene, tertiary butyl styrene, etc.); U.S. Pat. No. 5,059,300 to McGinnis (Chevron) (phosphoric acid); U.S. Pat. No. 4,393,155 to Garrett (Ashland Oil) (polyacrylamides). It is especially preferred to add styrene-butadiene copolymers or styrene-butadiene-styrene (SBS) copolymers to the blended asphalt products of the present invention. Such copolymers are added in amounts comprising 0.1 to 20 wt. %, preferably 0.5 to 12 wt. % copolymers.

DESCRIPTION OF THE PREFERRED EMBODIMENTS

EXAMPLES

Ternary blends were prepared from SDA bottoms, AC-5 (asphalt cement of 500 poise obtained from vacuum tower bottoms), and a flux oil. Flux oils used in the examples were selected from aromatic extract (AE325)(Comparative), foots oil, and 325 Neutral Oil. Selected properties of the flux oils are provided in Table I below. In order to minimize differences, the same SDA bottoms and AC-5 were used for all blends. Compositions were adjusted to produce asphalt cements with a final viscosity of approximately 2000 poise (AC-20). Blends contained between 12 and 15 wt. % of the flux oil. Blend compositions are set out in Table 2 below.

High temperature properties of all the blends set out in Table 3 below were similar. This was expected because all the blends possessed similar viscosities. The blend made with AE325 showed a high temperature limit of 63.9° C. after RTFO treatment (AASHTO T 240), and therefore grades as a PG 58. This also had a negative effect on the low temperature grade. Overall differences in high temperature performance of the ternary blends were minor, with the high temperature limits ranging from 63.9° C. for the AE325 blend to 66.4° C. for the 325 Neutral oil blend.

Fatigue cracking performance of an asphalt was determined by the Dynamic Shear Test (DST) conducted on the PAV (Pressure Aging Vessel-AASHTO PP1) treated sample. Results indicated the blend made with AE 325 would have poorer fatigue cracking characteristics, while the blend made with 325 Neutral oil displayed the best resistance to fatigue cracking. All of the blends made with paraffinic oils displayed better fatigue cracking resistance than the blend made with aromatic extract.

Low temperature properties were determined by the BBR test (AASHTO TP1—"Test Method for Determining the Flexural Creep Stiffness of Asphalt Binder Using the Bending Beam Rheometer"). The 325 Neutral oil blend displayed much better stiffness characteristics than the other samples, possessing a low temperature stiffness limit of −35.9° C. The foots oil sample displayed a poor m-value which indicated this material would crack during a rapid temperature drop. M-values for blends made with aromatic extract or 325 Neutral oil indicated they would have low temperature limits of −25.0° C. and −26.7° C., respectively. Asphalt cement made with 325 Neutral oil displayed slightly better low temperature properties than the other blends.

Polymer interaction was examined by blending in 3 wt. % styrene-butadiene-styrene co-block polymer (SBS) into the ternary blends. SHRP grading results (pass temperatures) are summarized in Table 4 below. Table 5 discloses SHRP Grades for Blends with 3 Wt. % SBS Polymer, and Table 6 provides SHRP Pass Temperatures for Polymer Blends. Blend compositions were identical to those used in Example 1. It was more difficult to digest the polymer when aromatic extract was not present in the mixture, given that Neutral and foots oils are paraffinic in nature and do not readily associate with the SBS polymer.

The polymer blends showed improved high temperature properties. The Neutral oil blend reached a PG 82 grade, while the AE 325 and foots oil blends produced PG 70 asphalts. The jump observed in high temperature for the Neutral oil blend suggests polymer addition rate could be reduced in this blend.

All of the polymer blends displayed good fatigue cracking characteristics, with the foots oil and AE325 samples displaying slightly better performance than the Neutral oil sample.

Blends made with Neutral oil and foots oil displayed poor m-values, causing a degradation in the low temperature SHRP properties. The blend made with AE 325, actually showed an improvement in low temperature properties as the polymer was added, suggesting aromatic extract has greater compatibility with the SBS polymer, giving rise to a stabilization of low temperature properties.

The examples show that high temperature rutting properties of asphalt cements can be controlled by binder viscosity. The paraffinic flux oils of the present invention examined in this study can produce the desired high temperature properties, with the 325 Neutral blends exhibiting desired low temperature properties as well. The large improvement observed in high temperature performance of polymer modified 325 Neutral oil blend suggests a higher polymer efficiency for this system.

TABLE 1

Properties of Flux Oils

|  | 325 AE | Foots Oil | 325 Neutral |
| --- | --- | --- | --- |
| Sp. Gravity | 0.993 | 0.843 | 0.879 |
| API (@ 60° F.) | 11.0 | 36.3 | 29.5 |
| Viscosity (40° C.) | 2500 | 15.20 | 64.31 |
| Viscosity (60° C.) | 86 | 3.71 | 8.33 |
| Initial BP (° F.) | 630 |  | 681 |
| Final BP (° F.) | 1085 |  | 1025 |
| 1st Smoke (° F.) | 240 |  |  |
| Cont Smoke (° F.) | 250 |  |  |
| COC Flash (° F.) | 490 |  |  |

TABLE 2

Blend Compositions

| Sample # | Flux Oil | SDA % | AC5 % | Flux % | Viscosity (140° F.) |
| --- | --- | --- | --- | --- | --- |
| 1 | AE 325 | 35 | 53 | 12 | 2081 |
| 2 | Foots Oil | 50 | 38 | 13 | 2149 |
| 3 | 325 N Oil | 53 | 32 | 15 | 2119 |

TABLE 3

SHRP Grade

| Sample # | Flux Oil | PG | High (° C.) | Low (° C.) | UTI* |
| --- | --- | --- | --- | --- | --- |
| 1 | AE 325 | 58-16 | 63.9 | −17.0 | 80.9 |
| 2 | Foots Oil | 64-16 | 66.1 | −20.7 | 86.8 |
| 3 | 325 N Oil | 64-22 | 66.4 | −26.7 | 93.1 |

*Useful Temperature Index

TABLE 4

SHRP Pass Temperatures (° C.)

| Sample # (Flux Oil) | $DSR_{orig}$ | $DSR_{RTFO}$ | $DSR_{PAV}$ | BBR (Stiff) | BBR (m-value) |
| --- | --- | --- | --- | --- | --- |
| 1 (AE 325) | 66.8 | 63.9 | 24.5 | −16.1 | −15.0 |
| 2 (Foots Oil) | 66.1 | 70.6 | 21.4 | −15.2 | −10.7 |
| 3 (325 N Oil) | 66.4 | 67.7 | 20.3 | −25.9 | −16.7 |

TABLE 5

SHRP Grade of Blends with 3 Wt. % SBS Polymer

| Sample # | Flux Oil | PG | High (° C.) | Low (° C.) | UTI* |
| --- | --- | --- | --- | --- | --- |
| 1 | AF 325 | 70-28 | 70.9 | −29.7 | 100.6 |
| 2 | Foots Oil | 70-10 | 71.7 | −14.1 | 85.8 |
| 3 | 325 N Oil | 82-10 | 82.2 | −15.3 | 97.5 |

*Useful Temperature Index

TABLE 6

SHRP Pass Temperatures for Polymer Blends

| Sample # (Flux Oil) | $DSR_{orig}$ | $DSR_{RTFO}$ | $DSR_{PAV}$ | BBR (Stiff) | BBR (m-value) |
| --- | --- | --- | --- | --- | --- |
| 1 (AE 325) | 70.9 | 71.0 | 20.3 | −21.9 | −19.7 |
| 2 (Foots Oil) | 71.7 | 72.5 | 19.5 | −13.0 | −4.1 |
| 3 (325 N Oil) | 82.2 | 83.0 | 24.6 | −30.9 | −5.3 |

MODIFICATIONS

Specific compositions, methods, or embodiments discussed are intended to be only illustrative of the invention disclosed by this specification. Variations on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference including any patents or other literature references cited within such documents.

What is claimed is:

1. An environmentally improved asphalt paving composition which contains a solvent-precipitated asphaltene and a viscosity reducing amount of paraffinic fluxing component.

2. The composition of claim 1 which comprises 1 to 90 wt. % of asphalt component containing, as a proportion of said asphalt component, at least 0.5 wt. % solvent precipitated asphaltenes; 0.1 to 50 wt. % of a paraffinic fluxing component; and 0 to 15 wt. % aromatics having a 5% distillation boiling point of less than 510° C.

3. The composition of claim 2 which comprises 1.5 to 20 wt. % of asphalt component containing, as a proportion of said asphalt component, at least 1.0 wt. % solvent precipitated asphaltenes; 0.5 to 10 wt. % of a paraffinic fluxing component; and 0 to 10 wt. % aromatics having a 5% distillation boiling point of less than 510° C.

4. The composition of claim 2 wherein said solvent precipitated asphaltenes are SDA bottoms obtained from solvent extraction of vacuum bottoms, said SDA bottoms having Ring and Ball Softening Points ranging from 40° to 120° C., boiling points greater than 510° C., and said paraffinic fluxing component is selected from the group consisting of Neutral oil, foots oil, slack wax and poly (alphaolefins).

5. The composition of claim 4 wherein said SDA bottoms have boiling points greater than 540° C., and said paraffinic fluxing component is 325 Neutral oil.

6. The composition of claim 2 wherein said asphalt component further comprises 0.5 to 90 wt. % of vacuum bottoms obtained from vacuum distillation.

7. The composition of claim 2 wherein said asphalt component further comprises 0.1 to 20 wt. % of a polymer additive.

8. The composition of claim 7 which further comprises 0.1 to 15 wt. % of a polymer additive selected from the group consisting of styrene-butadiene copolymer and styrene-butadiene-styrene copolymer.

9. The composition of claim 2 which contains an unoxidized blend of asphalt component containing solvent precipitated asphaltenes and paraffinic fluxing component.

10. The composition of claim 2 wherein said asphalt component contains no added aromatics having a 5% distillation boiling point of less than 510° C.

11. A pavement composition containing aggregate and 1 to 10 wt. % of an environmentally improved asphalt paving composition which comprises 1 to 90 wt. % of asphalt component containing, as a proportion of said asphalt component, at least 0.5 wt. %, solvent precipitated asphaltenes; 0.1 to 50 wt. % of a paraffinic fluxing component; and 0 to 15 wt. % aromatics having a 5% distillation boiling point of less than 510° C.

12. A method for preparing an environmentally proved paving asphalt composition containing an asphalt component containing solvent-precipitated asphaltene by adding a viscosity reducing amount of paraffinic fluxing component to said asphalt component.

13. The method of claim 12 which further comprises combining aggregate with said asphalt component.

14. The method of claim 12 wherein said asphalt component is an unoxidized blend of solvent-precipitated asphaltene and a viscosity reducing amount of paraffinic fluxing component.

15. The method of claim 14 wherein said paraffinic fluxing component is selected from the group consisting of Neutral oil, foots oil, slack wax and poly(alphaolefins).

16. The method of claim 14 wherein said paraffinic fluxing component is 325 Neutral oil.

17. The method of claim 12 which further comprises adding vacuum bottoms obtained from vacuum distillation to said asphalt component.

18. The method of claim 17 wherein said vacuum bottoms comprise AC5.

19. The method of claim 12 which further comprises adding 0.1 to 20 wt. % of a polymer additive to said asphalt component.

20. The method of claim 12 wherein said asphalt component contains no added aromatics having a 5% distillation boiling point of less than 510° C.

\* \* \* \* \*